United States Patent [19]
Tsukamoto et al.

[11] Patent Number: 5,573,478
[45] Date of Patent: Nov. 12, 1996

[54] QUICK SHIFT HYDRAULIC CONTROL FOR A TWO STAGE JUMP SHIFT

[75] Inventors: Kazumasa Tsukamoto, Toyota; Masahiko Ando, Okazaki; Masahiro Hayabuchi, Anjo; Yoshihisa Yamamoto, Nishio; Toshihiro Kano, Anjo, all of Japan

[73] Assignee: Aisin Aw Co., Ltd., Japan

[21] Appl. No.: 315,065

[22] Filed: Sep. 29, 1994

[30] Foreign Application Priority Data

Sep. 29, 1993 [JP] Japan ..................... 5-243366

[51] Int. Cl.⁶ ............................................ F16H 61/00
[52] U.S. Cl. ..................... 477/130; 477/143; 477/150
[58] Field of Search .............................. 477/70, 86, 130, 477/143, 144, 145, 150, 163; 475/129

[56] References Cited

U.S. PATENT DOCUMENTS

| | | | |
|---|---|---|---|
| 4,532,829 | 6/1985 | Sugano | 477/130 X |
| 4,722,251 | 2/1988 | Sumiya et al. | 477/143 |
| 4,889,015 | 12/1989 | Kondo | 477/143 X |
| 5,010,787 | 4/1991 | Takada et al. | 477/143 X |
| 5,094,130 | 10/1992 | Hirose et al. | 477/130 X |
| 5,161,434 | 11/1992 | Hayasaki | 477/146 X |
| 5,397,284 | 3/1995 | Matsumoto et al. | 477/150 |
| 5,501,645 | 3/1996 | Taniguchi et al. | 477/130 |
| 5,505,673 | 4/1996 | Tsukamoto et al. | 477/130 |

FOREIGN PATENT DOCUMENTS

| | | |
|---|---|---|
| 4035726 | 5/1991 | Germany . |
| 4042045 | 7/1991 | Germany . |

Primary Examiner—Khoi Q. Ta
Attorney, Agent, or Firm—Lorusso & Loud

[57] ABSTRACT

A controller for an automatic transmission which reduces wear of frictional engagement elements and shortens gear change time even when a gear change jump is made. The controller of the present invention includes a first hydraulic servo to which oil is supplied to make a gear change jump, a second hydraulic servo to which oil is supplied to make a gear change to an intermediate gear stage, a limited supply oil circuit having an oil flow limiting element, a quick supply oil circuit bypassing the oil flow limiting element and a pressure governor for regulating a line pressure to supply oil at a controlled pressure to the quick supply oil circuit. An oil path switching valve switches oil supply, to the first hydraulic servo or the second hydraulic servo, between the limited supply oil circuit and the quick supply oil circuit. Accordingly, when a gear change jump is made, oil is supplied to the first hydraulic servo via the quick supply oil circuit and the operating pressure can be increased quickly, so that the gear change time is shortened.

10 Claims, 17 Drawing Sheets

FIG. 3

| Position | | | S1 | S2 | S3 | S4 | SLU | SLN | C1 | C2 | C0 | B1 | B2 | B3 | B0 | F1 | F2 | F0 |
|---|---|---|---|---|---|---|---|---|---|---|---|---|---|---|---|---|---|---|
| P | | | O | X | O | O | X | — | X | X | X | X | X | X | X | X | X | X |
| R | Normal | | O | X | O | O | X | — | X | O | O | X | X | X | X | X | X | O |
|  | Forbidden Time *1 | | O | O | O | O | X | — | X | X | O | X | X | X | X | X | X | O |
| N | | | O | X | O | *2 | X | — | X | X | *3 | X | X | X | *4 | X | X | X |
| D・2・L | 1ST | Normal | O | X | O | O | X | — | O | X | O | X | X | X | X | X | O | O |
|  |  | Engine Brake | O | X | O | X | X | △ | O | X | O | X | X | X | X | O | X | O |
|  | 2ND | Normal | O | O | O | O | ◎ | — | O | X | O | △ | O | X | X | X | X | O |
|  |  | Engine Brake | O | O | O | X | ◎ | △ | O | X | O | X | O | X | X | X | X | O |
|  | 3RD | | O | O | X | O | ◎ | — | O | O | O | X | O | X | X | X | X | O |
|  | 4TH | | X | X | O | O | ◎ | △ | O | O | X | X | O | X | O | X | X | X |
| Quick Control | 1→2 Gear Change | | O | O | O | X | ◎ | △ | O | X | O | X | △ | X | X | △ | △ | O |
|  | 2→3 Gear Change | | X | O | X | X | ◎ | △ | O | O | O | X | O | X | X | △ | X | O |
|  | 3→4 Gear Change | | X | X | O | X | ◎ | △ | O | O | X | X | O | X | △ | X | X | △ |

| Remarks | |
|---|---|
| O | On |
| X | Off |
| ◎ | On: L-up On   Off: L-up Off |
| △ | Duty Control Only During Gear Change |

Solenoid — Clutch: Engage / Release — Brake: Govern Pressure by Pressure Control Valve — One-way Clutch: Lock / Free / By Controlled Pressure FIG. 13
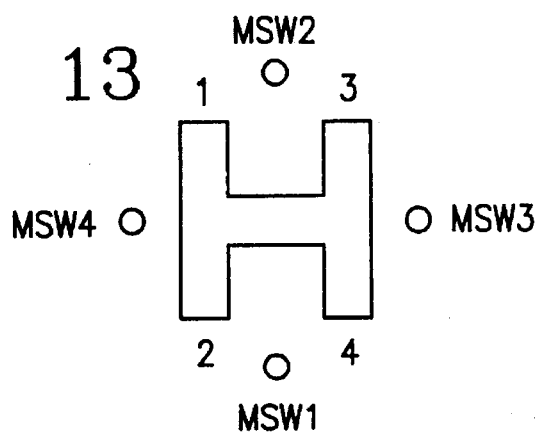
FIG. 14
| Shift Position | Manual Switch | | | |
|---|---|---|---|---|
| | MSW1 | MSW2 | MSW3 | MSW4 |
| D1 | × | ○ | × | ○ |
| D2 | × | ○ | ○ | × |
| D3 | ○ | × | × | ○ |
| D4 | ○ | × | ○ | × |
FIG. 15
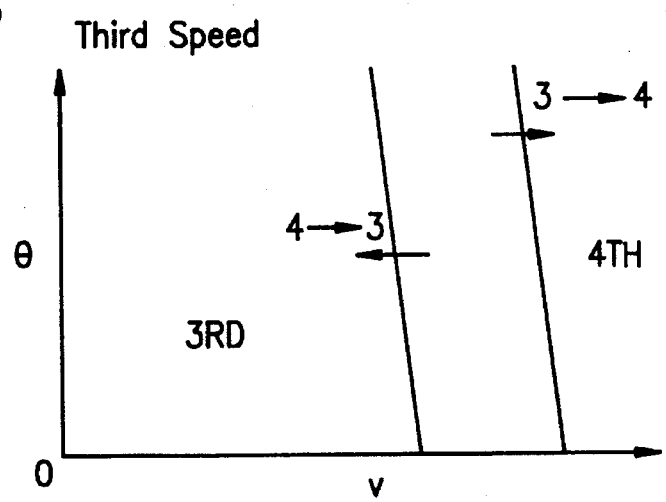

QUICK SHIFT HYDRAULIC CONTROL FOR A TWO STAGE JUMP SHIFT

BACKGROUND OF THE INVENTION

1. Field of the Invention

The present invention relates to a controller (control system) for an automatic transmission.

2. Description of Related Art

Conventionally, P (parking) range, R (reverse) range, N (neutral) range, D (drive) range, 2 (second) range and L (low) range are provided for in an automatic transmission and a driver selects a range by moving a shift lever to one of plural positions, arranged in an I shaped pattern and corresponding to these ranges. A gear change is automatically selected in accordance with a detected traveling condition of the vehicle.

In another prior art system the shift lever positions are arranged in an H shape, similar to a manual shift, to allow movement of the shift lever to a range position for travel in an automatic gear change mode or movement of the shift lever to a shift position for travel in a manual gear change mode (See Japanese Patent Laid-Open No. Hei 3-199758). This latter system allows a driver to freely shift to a selected gear stage and to obtain a good "shift feeling."

In the automatic transmission having only the I pattern of range positions, a gear change jump (e.g. 1–3 gear change, 1–4 gear change, etc.) is sometimes made, responsive to a traveling condition of the vehicle. Further, in the automatic transmission having the I pattern of range positions, as well as those having an H pattern of shift positions, a gear change jump is sometimes made by manipulation of the shift lever, for example while driving the vehicle in the manual gear change mode.

In such cases, although it is ideal to make the gear change directly to a targeted gear stage (gear speed), the thermal load on the frictional engagement elements engaged during the gear change becomes great when the gear change is made directly to the targeted gear stage, thus reducing the durability of the frictional engagement elements.

While it is possible to increase the number of friction members of the frictional engagement devices or to increase their frictional area, such increases not only enlarge the size and weight of the automatic transmission, but also lead to a dragging loss in the friction members. Thus, the thermal load on the frictional engagement elements is reduced by making a gear change to an intermediate gear stage, between the present gear stage and the targeted gear stage, when a gear change jump is to be made.

A gear change to the targeted gear stage is made only after firmly completing the gear change to the intermediate gear stage, by switching to a solenoid valve for the gear change to the targeted gear stage when the ratio of input rotary speed to output rotary speed reaches a preset value, in order to suppress shift shock (See Japanese Patent Laid-Open No. Hei 1-188750).

However, the frictional engagement elements for making the gear change to the intermediate gear stage and the frictional engagement elements for making the gear change to the targeted gear stage are engaged by supplying oil to the hydraulic servos and the hydraulic pressure is raised by an accumulator, so that it takes a considerable time to raise the hydraulic pressure to that whereby the frictional engagement elements can be engaged. Accordingly, a gear change through an intermediate gear stage not only prolongs the time required for making the gear change (hereinafter referred to as "the gear change time"), but also conveys an undesirable sensation to the driver.

Accordingly, it is an object of the present invention to solve the aforementioned problems of the prior art controllers for automatic transmissions by providing a controller which prolongs the useful life (durability) of the frictional engagement elements and shortens the gear change time, even when a gear change jump is made, and conveys no undesirable sensation to the driver.

SUMMARY OF THE INVENTION

In order to achieve the aforementioned objective, the present invention provides a control system which includes a first hydraulic servo to which oil is supplied to make a gear change jump from a current gear stage (gear speed) to a targeted gear stage, a second hydraulic servo to which oil is supplied to make a gear change from the current gear stage to an intermediate gear stage, a limited supply oil circuit created through oil flow limiting means, a quick supply oil circuit bypassing the oil flow limiting means, and oil pressure governing means for regulating a line pressure to provide a controlled pressure which is fed to the quick supply oil circuit. The control system also includes oil path switching means for switching between the limited supply oil circuit and the quick supply oil circuit as the source of oil to the first hydraulic servo or the second hydraulic servo.

Accordingly, when a gear change jump is to be made, because operating pressure can be rapidly increased by supplying oil to the first hydraulic servo via the quick supply oil circuit and, further, because the operating pressure can be quickly increased by supplying oil to the second hydraulic servo via the quick supply oil circuit, wear of the frictional engagement elements may be reduced, the gear change time may be shortened, even when a gear change jump is made, and no undesirable sensation is conveyed to the driver.

Furthermore, because the operating pressure can be directly controlled by the pressure governing means, the operating pressure in the transient state may be accurately controlled.

The above and other advantages of the present invention will become more apparent from the following description and the accompanying drawings in which like numerals refer to identical components.

BRIEF DESCRIPTION OF THE DRAWINGS

FIG. 3 is a table showing operations of the automatic transmission of FIG. 2 in accordance with the present invention;

FIG. 13 is a schematic diagram of a manual switch which may be utilized in the present invention;

FIG. 14 is a table for determining shift positions according to the present invention;

FIG. 15 is a graph in the form of a speed change map according to the present invention;

DETAILED DESCRIPTION OF PREFERRED EMBODIMENT

Figure 1:
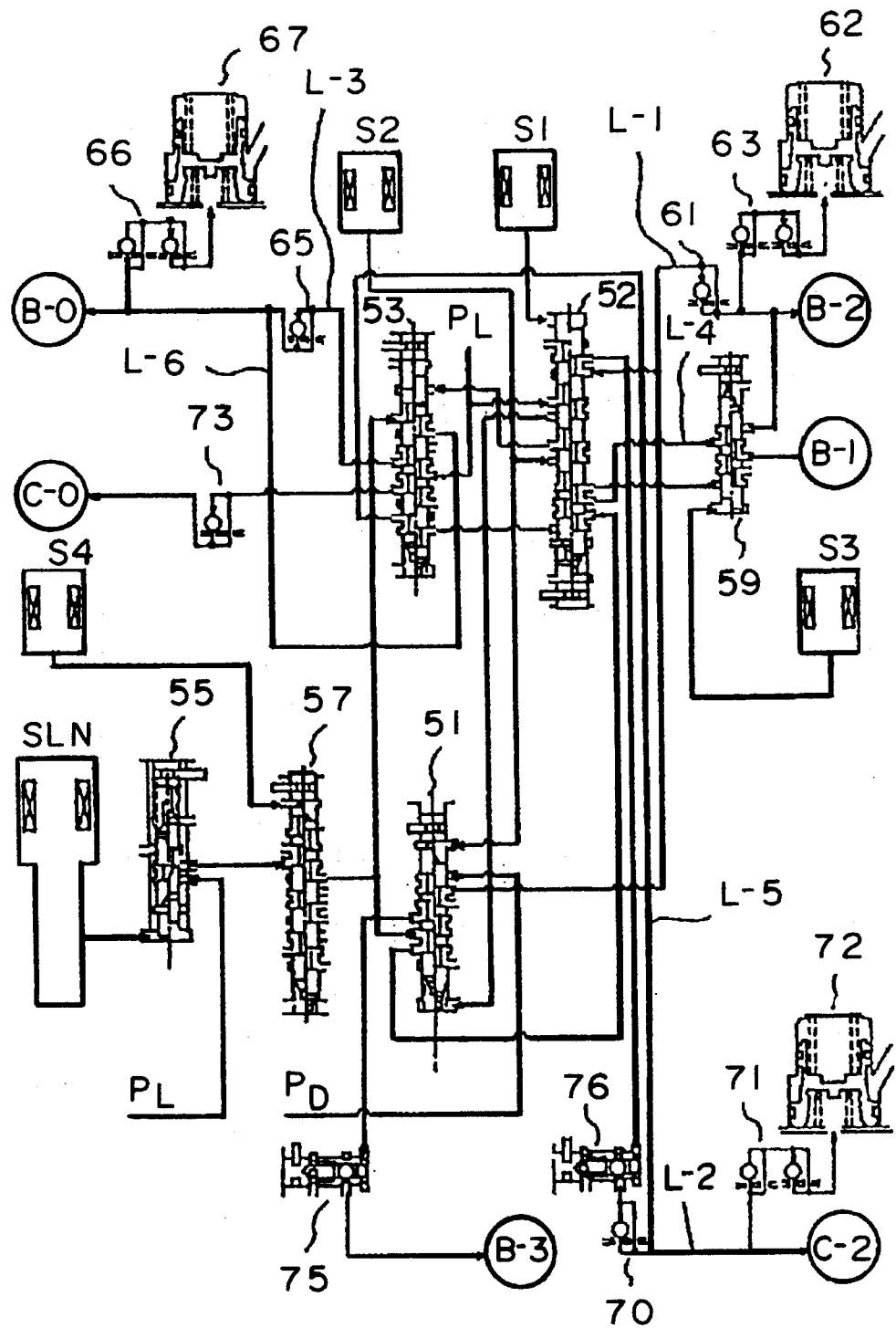
FIG. 1 is a diagram showing a hydraulic control circuit according to an embodiment of the present invention.

Referring now to the drawings, a preferred embodiment of the present invention will be explained in detail.

Figure 2:
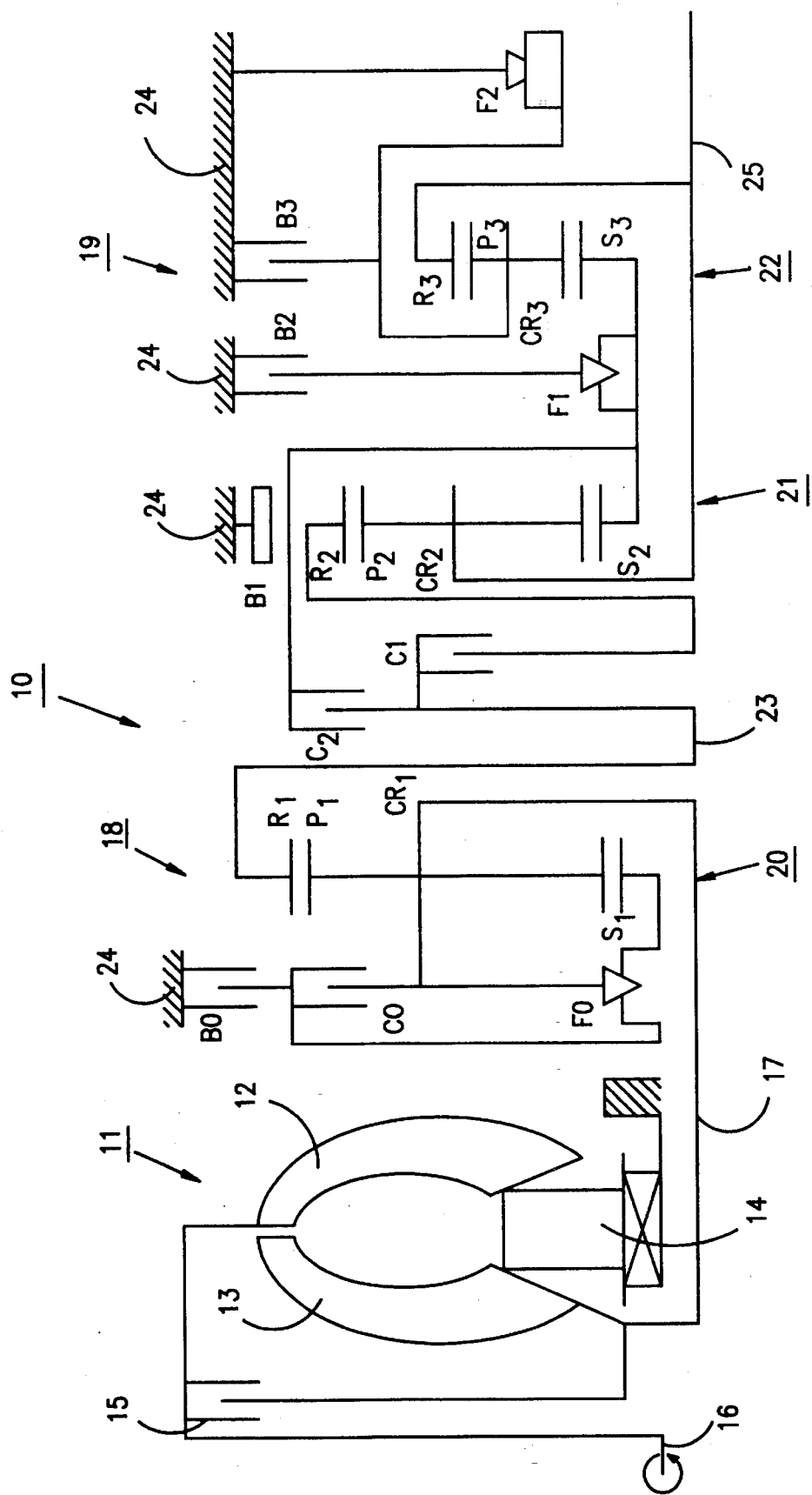
FIG. 2 is a schematic diagram of an automatic transmission to which the hydraulic control circuit of FIG. 1 may be applied.

FIG. 2 shows an automatic transmission which has a transmission section (T/M) 10 and a torque converter 11, wherein rotation generated by an engine (not shown) is transmitted through the torque converter 11 to the transmission 10. The transmission 10 changes the speed of rotation and transmits rotation at the new speed to driving wheels (not shown).

The torque converter 11 includes a pump impeller 12, turbine runner 13 and stator 14, as well as a lock-up clutch 15, for improving power transmission efficiency. The torque converter 11 transmits rotation of an input member 16, which is an output shaft of the engine, to an input shaft 17 of the transmission 10, either indirectly by oil flow within the torque converter 11 or directly by locking the lock-up clutch 15.

The transmission 10 includes a sub-gear change unit 18 and main gear change unit 19. The sub-gear change unit 18 has an overdrive planetary gear unit 20 and the main gear change unit 19 has a front planetary gear unit 21 and rear planetary gear unit 22.

The overdrive planetary gear unit 20 includes a carrier $CR_1$ connected to the input shaft 17 and supporting a pinion $P_1$, sun gear $S_1$ surrounding the input shaft 17 and ring gear $R_1$ linked to an input shaft 23 of the main gear change unit 19. The carrier $CR_1$ and the sun gear $S_1$ are linked through the intermediary of a third clutch C0 and third one-way clutch F0. The sun gear $S_1$ is locked to case 24 through the intermediary of a fourth brake B0.

The front planetary gear unit 21 includes a carrier $CR_2$ connected to an output shaft 25 and supporting a pinion $P_2$. Sun gear $S_2$ surrounds the output shaft 25 and is integrated with a sun gear $S_3$ of the rear planetary gear unit 22. A ring gear $R_2$ is linked to the input shaft 23 through the intermediary of a first clutch C1. The input shaft 23 and the sun gear $S_2$ are linked through the intermediary of a second clutch C2. The sun gear $S_2$ is locked to the case 24 through the intermediary of a first brake B1 in the form of a band brake. The sun gear $S_2$ and the case 24 are further linked through the intermediary of a first one-way clutch F1 and second brake B2.

The rear planetary gear unit 22 includes a carrier $CR_3$ supporting a pinion $P_3$, sun gear $S_3$ and ring gear $R_3$ integral with the input shaft 25. The carrier $CR_3$ and the case 24 are linked through the intermediary of a third brake B3 and second one-way clutch F2 provided in parallel.

Solenoid valves S1 through S4, linear solenoid valves SLU and SLN, first clutch C1, second clutch C2, third clutch C0, first brake B1, second brake B2, third brake B3, fourth brake B0, first one-way clutch F1, second one-way clutch F2 and third one-way clutch F0 in the aforementioned automatic transmission are controlled as shown in FIG. 3 in each gear stage of the P-range, R-range D-range 2-range and L-range, respectively. By the way, *1 in FIG. 3 indicates a speed for prohibiting driving in the R-range which is set at 20 [km/h]; *2 indicates that each of the solenoid valves S1 through S4 in the N-range are controlled responsive to vehicle speed and follow a solenoid pattern for the D-range; *3 indicates that the third clutch C0 is engaged in the first to third speeds; *4 indicates that the fourth brake B0 is engaged in the fourth speed.

During the first speed (first gear stage) in the D-range, 2-range or L-range, the first clutch C1 and third clutch C0 are engaged and the second one-way clutch F2 and third one-way clutch F0 are locked. Therefore, in the overdrive planetary gear unit 20, a directly coupled state is created through the third clutch C0 and third one-way clutch F0 and the rotation of the input shaft 17 is transmitted to the main gear change unit 19 as is. Further, in the main gear change unit 19, the rotation of the input shaft 23 is transmitted to the ring gear $R_2$ of the front planetary gear unit 21 through the first clutch C1, to the carrier $CR_2$ and to the output shaft 25 which is integral with the carrier $CR_2$. This transmitted rotation tends to impart a torque to the carrier $CR_3$ of the rear planetary gear unit 22 through the sun gears $S_2$ and $S_3$, but the rotation of the carrier $CR_3$ is blocked by the lock of the second one-way clutch F2. Accordingly, the pinion $P_3$ autorotates and transmits the decelerated revolution to the ring gear $R_3$ which is integral with the output shaft 25.

During the second speed in the D-range, 2-range or L-range, the first clutch C1, third clutch C0 and second brake B2 are engaged and the first one-way clutch F1 and third one-way clutch F0 are locked. Therefore, in the overdrive planetary gear unit 20, the directly coupled state is maintained and the rotation of the input shaft 17 is transmitted to the input shaft 23 of the main gear change unit 19 as is. In the main gear change unit 19, the rotation of the input shaft 23 is transmitted to the ring gear $R_2$ of the front planetary gear unit 21 through the intermediary of the first clutch C1. The rotation received by unit 21 tends to impart a torque to the sun gear $S_2$ through the intermediary of the pinion $P_2$, but it is blocked because the first one-way clutch F1 is locked along with the engagement of the second brake B2. Accordingly, the carrier $CR_2$ rotates while autorotating the pinion $P_2$ and the second speed rotation is transmitted to the output shaft 25 only through the front planetary gear unit 21.

In the third speed in the D-range, 2-range or L-range, the first clutch C1, second clutch C2, third clutch C0 and second brake B2 are engaged and the third one-way clutch F1 is locked. Therefore, in the overdrive planetary gear unit 20, the directly coupled state is maintained and the rotation of the input shaft 17 is transmitted to the input shaft 23 of the main gear change unit 19 as is. In the main gear change unit 19, the front planetary gear unit 21 is directly coupled as the first clutch C1 and second clutch C2 are engaged and the rotation of the input shaft 23 is transmitted to the output shaft 25 as is.

During the fourth speed, i.e. the highest speed, in the D-range, 2-range or L-range, the first clutch C1, second clutch C2, second brake B2 and fourth brake B0 are engaged. In the main gear change unit 19, the third clutch C0 is released and the fourth brake B0 is engaged. Accordingly, the sun gear $S_1$ of the overdrive planetary gear unit 20 is locked by the engagement of the fourth brake B0, the carrier $CR_1$ rotates and transmits rotation while autorotating the pinion $P_1$ and the rotation of the overdrive is transmitted to the input shaft 23 of the main gear change unit 19 which is in the directly coupled state.

Next, the controller of the present invention will be described in connection with FIG. 4.

Figure 4:
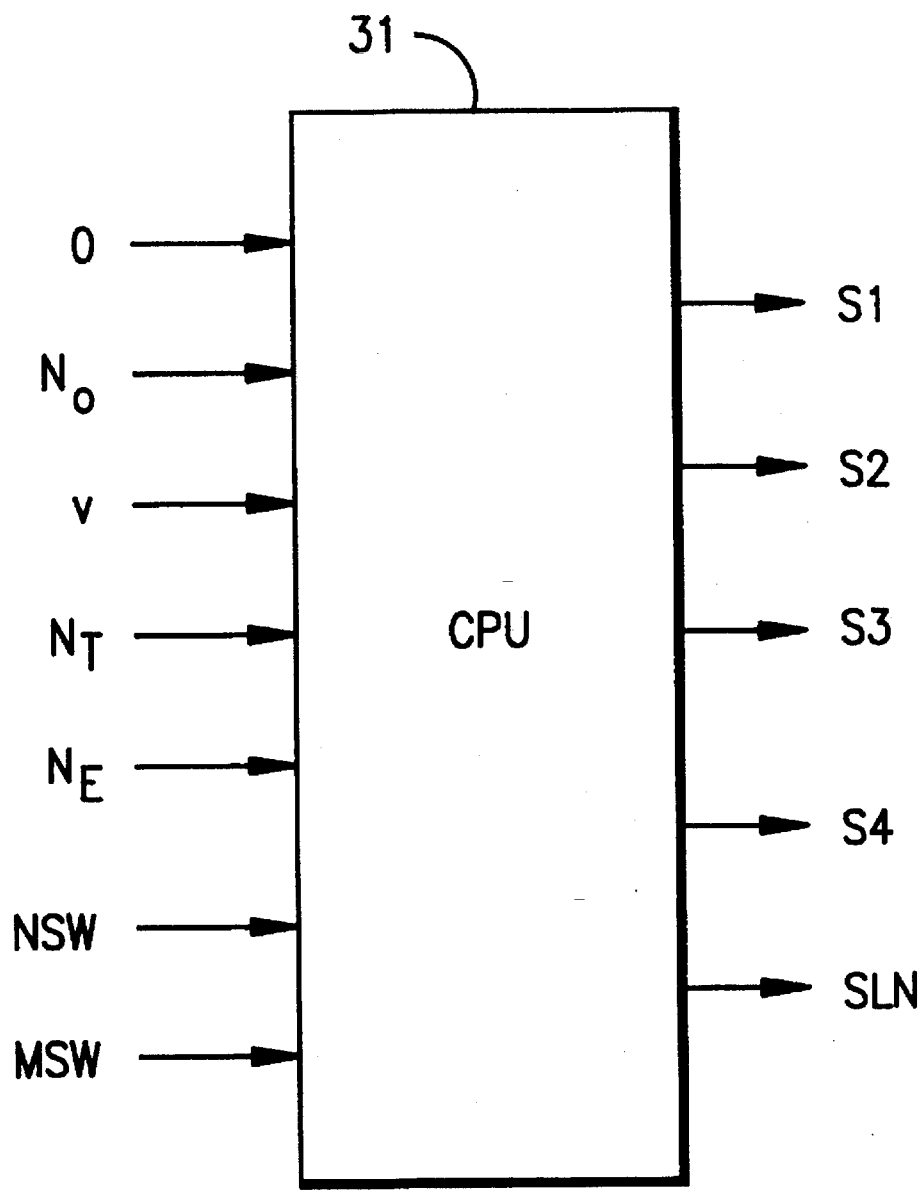
FIG. 4 is a schematic diagram of a CPU as utilized in the present invention.

As shown in FIG. 4, a CPU 31, which controls the whole control system of the present invention, receives signals for throttle opening theta (θ), output rotary speed $N_o$, car speed v, input rotary speed $N_T$, engine speed $N_E$ and other inputs in the form of detection signals, as well as a neutral start switch signal (NSW), and a manual switch signal (MSW).

CPU 31 controls the solenoid valves S1 through S4 and linear solenoid valve SLN, etc. The solenoid valve S1 switches a 2–3 shift valve (not shown), solenoid valve S2 switches a 1–2 shift valve and 3–4 shift valve (not shown), solenoid valve S3 switches a B-1 timing valve (not shown) and solenoid valve S4 switches an engine brake control valve (not shown). The linear solenoid valve SLN governs a pressure control valve (not shown).

The CPU 31 determines a traveling pattern for the vehicle based on each detection signal, controls the linear solenoid valve SLN in accordance with the determined traveling pattern and controls oil pressure supplied to hydraulic servos (not shown) to engage the frictional engagement elements (not shown) (hereinafter referred to as "the operating pressure").

Next, the CPU 31 will be explained in detail with reference to FIG. 5.

Figure 5:
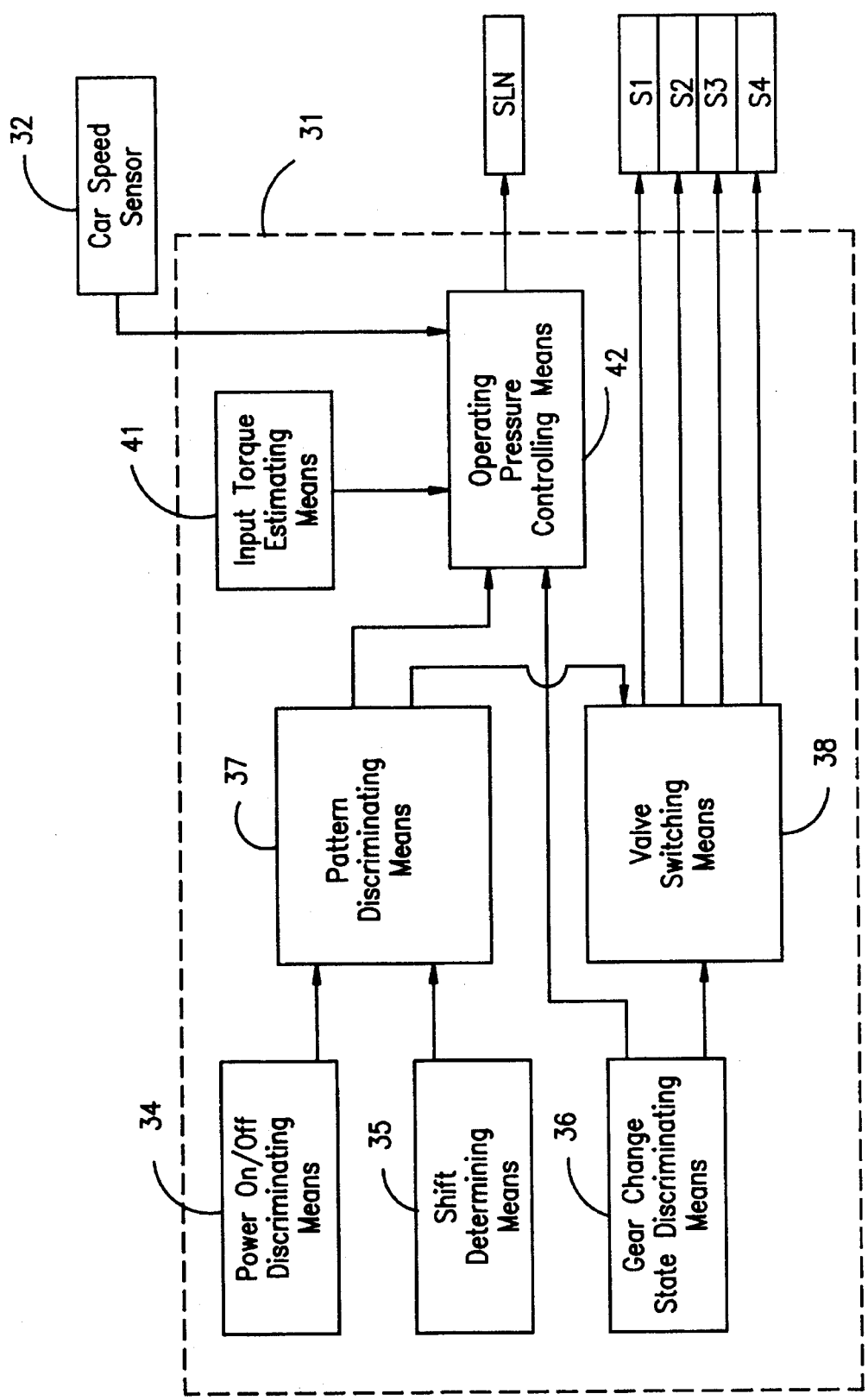
FIG. 5 is a block diagram of the CPU of FIG. 4.

As seen in FIG. 5, a car speed sensor 32 detects speed v, and power on/off discriminating means 34 determines whether or not the vehicle is in a power-on state. This power on/off discriminating means 34 may operate by detection of depression of an accelerator pedal (not shown) and determines that the vehicle is in the power-on state when the pedal is depressed and that the vehicle is in the power-off state when the pedal is not depressed.

Shift determining means 35 determines whether an upshift gear change or down-shift gear change is to be made and whether or not a gear change to an intermediate gear stage is to be made in effecting the up-shift gear change. Gear change state discriminating means 36 determines whether or not the gear change to the intermediate gear stage is about to be completed. Pattern discriminating means 37 determines a gear change pattern for the vehicle based on the determinations the power on/off discriminating means 34 and the shift determining means 35. Valve switching means 38 controls the solenoid valves S1 through S4 based on the determinations of the gear change state discriminating means 36 and the pattern discriminating means 37. Input torque estimating means 41 estimates input torque and operating pressure control means 42 controls the linear solenoid valve SLN based on the determinations of the gear change state discriminating means 36 and the pattern determining means 37 and the estimation obtained by the input torque estimating means 41.

Next, the operation of the controller of FIGS. 1, 4 and 5 will be explained with reference to FIG. 6 which illustrates operation in the quick control mode.

Figure 6:
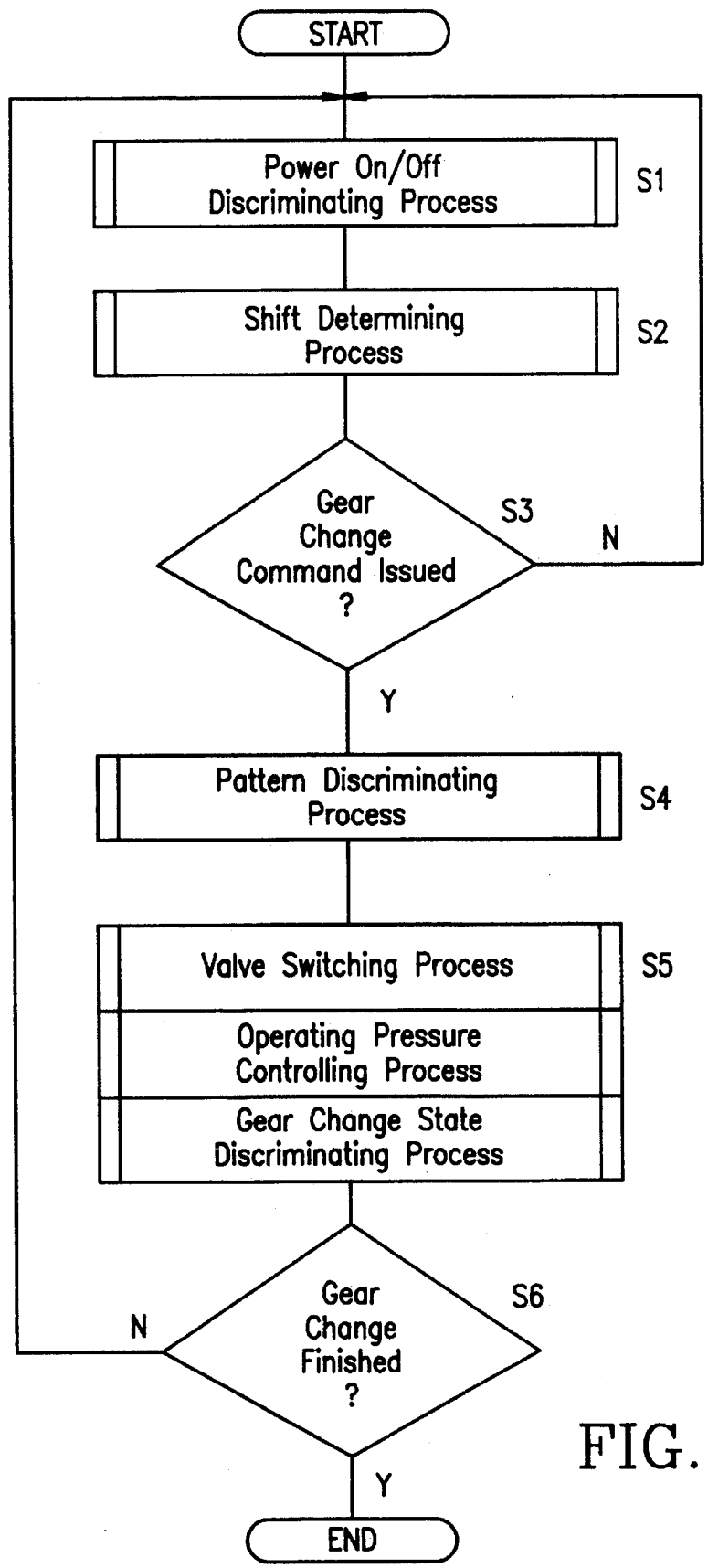
FIG. 6 is a main flowchart showing an operation of quick control by the controller of the present invention.

In FIG. 6:

Step S1: Determine whether the vehicle is in the power on or off state by the power on/off discriminating means 34 (FIG. 5).

Step S2: The shift determining means 35 determines whether an up-shift gear change is to be made or down-shift gear change is to be made, and when the up-shift gear change is to be made, whether or not a gear change to an intermediate gear stage is to be made.

Step S3: Determine whether or not a gear change command is being issued. When a gear change command is being issued, advance to Step S4 and when no gear change command is being issued, return to Step S1.

Step S4: The pattern determining means 37 determines the gear change pattern of the vehicle.

Step S5: The valve switching means 38 controls the solenoid valves S1 through S4, the operating pressure control means 44 controls the linear solenoid valve SLN and the gear change state discriminating means 36 determines whether or not the gear change to the intermediate gear stage is about to be completed.

Step S6: Determine whether or not the gear change has been completed. If the gear change has been completed, end the process and when the gear change has not been finished, return to Step S1.

Figure 7:
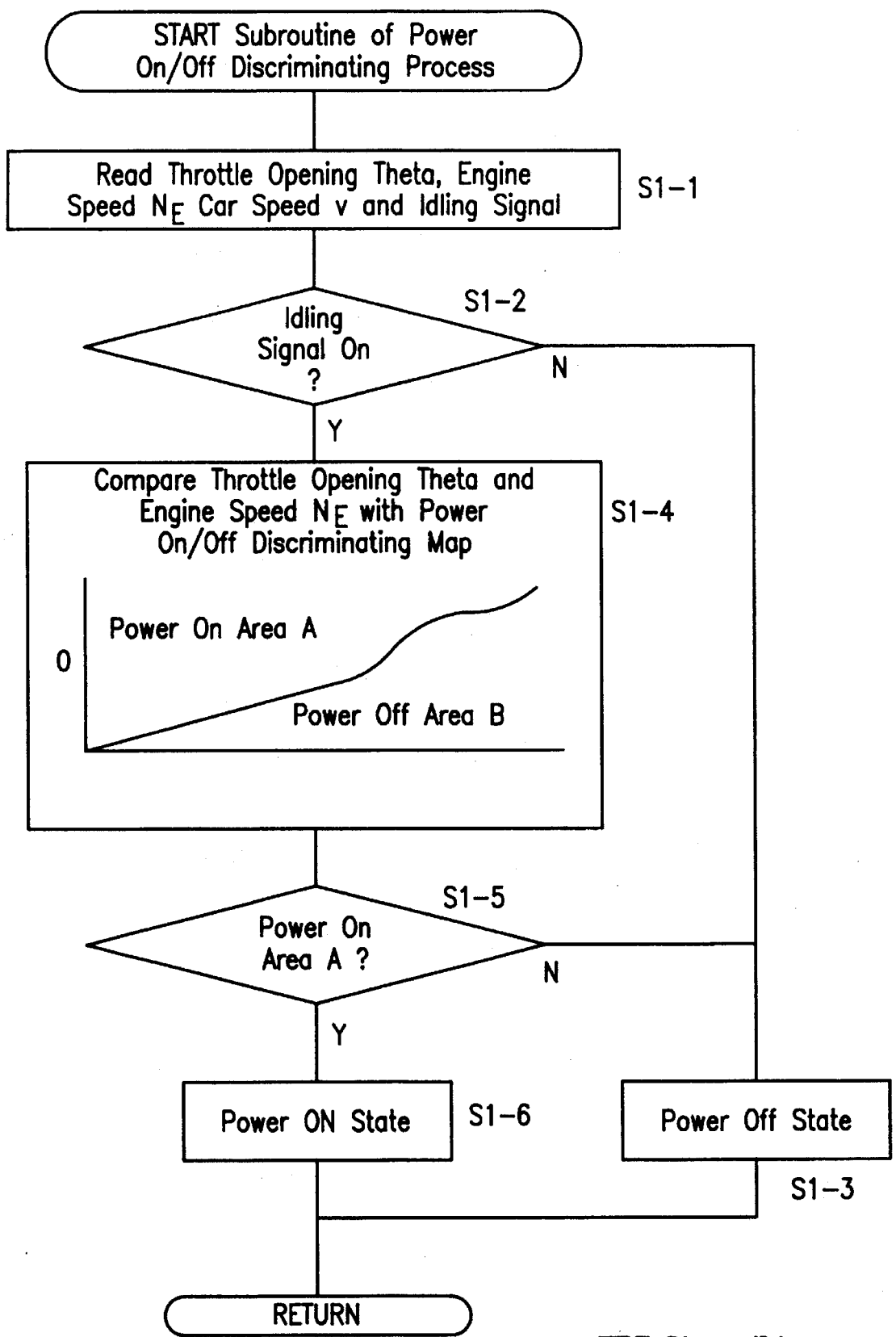
FIG. 7 is a flowchart of a subroutine of a power on/off discriminating process in the present invention.

Next, a subroutine for the power on/off discriminating means 34 in Step S1 in FIG. 6 will be explained with reference to FIG. 7.

FIG. 7:

Step S1-1: Read the throttle opening θ, engine speed $N_E$, car speed v and idling signal.

Step S1-2: Determine whether or not the idling signal is on. When it is on, it is apparent that the accelerator pedal (not shown) is depressed, so advance to Step S1-3 and when it is off, advance Step S1-4.

Step S1-3: Determine that the vehicle is in the power off state.

Step S1-4: Compare the throttle opening θ and engine speed $N_E$ with a power on/off discrimination map. In this case, the power on/off discrimination map has a power-on area A and power-off area B as shown in the figure.

Step S1-5: Spot a point for the detected throttle opening θ and engine speed $N_E$ and determine whether or not the spotted point falls within power-on area A. If in the power-on area A, advance to Step S1-6 and if in the power-off area B, advance to Step S1-3.

Step S1-6: Determine that the vehicle is in the power on state.

Next, a subroutine for the shift determining process performed by the shift determining means 35 (FIG. 5) in Step 2 of FIG. 6 will be explained with reference to FIGS. 8–11.

Figure 8:
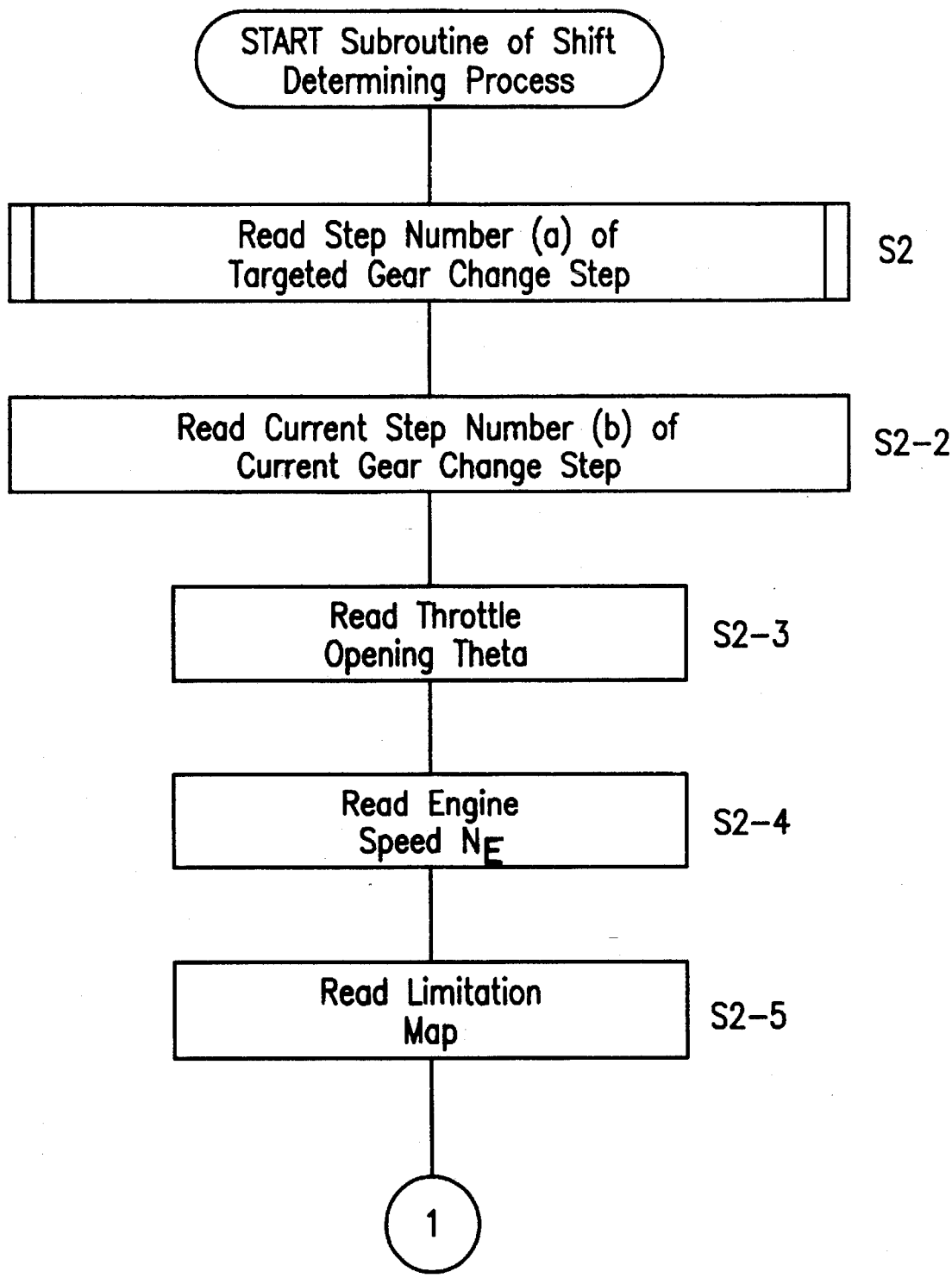
FIG. 8 is a flowchart of a first embodiment of a subroutine of a shift determining process in the present invention.
Figure 9:
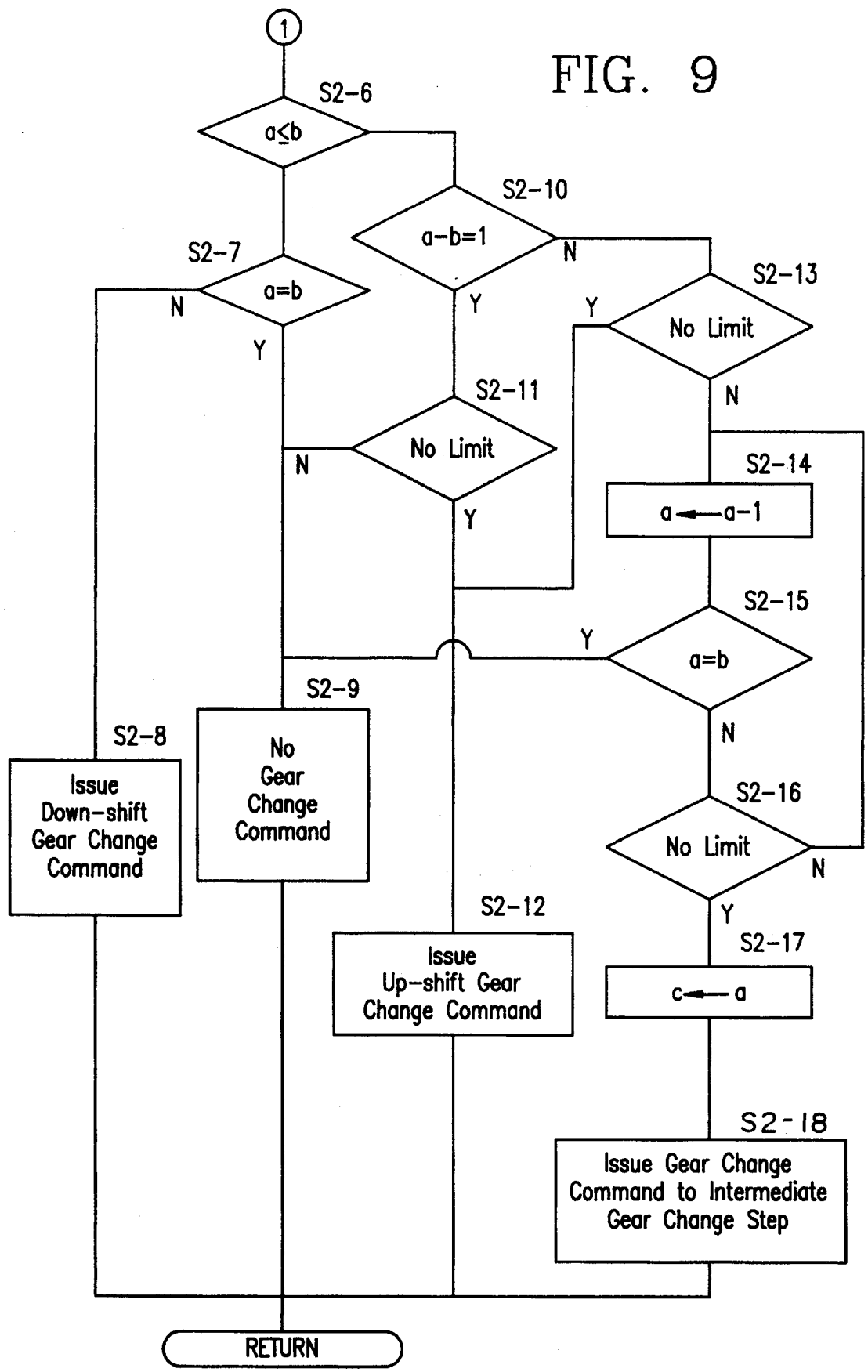
FIG. 9 is a flowchart of a second embodiment of the subroutine of the shift determining process in the present invention.

In FIG. 8:

Step S2-1: Read the stage number (a) (a=1, 2, 3, 4) of the targeted gear stage (gear speed).

Step S2-2: Read the stage number (b) (b=1, 2, 3, 4) of the current gear stage.

Step S2-3: Read the throttle opening $\theta$.

Step S2-4: Read the engine speed $N_E$.

Figure 10:
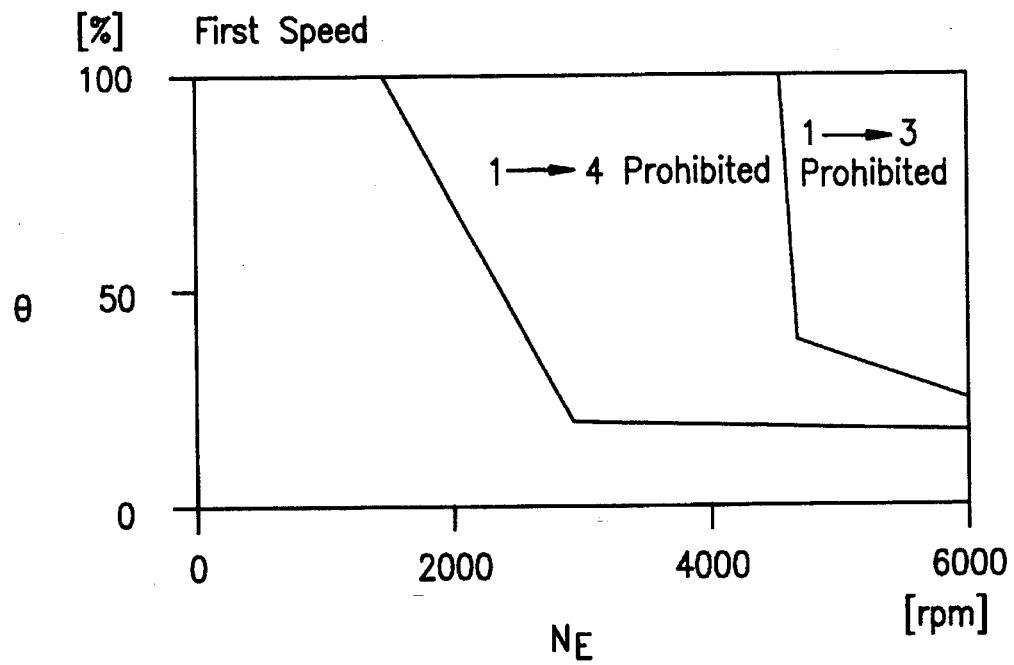
FIG. 10 is a graph showing a first embodiment of a limitation map according to the present invention.
Figure 11:
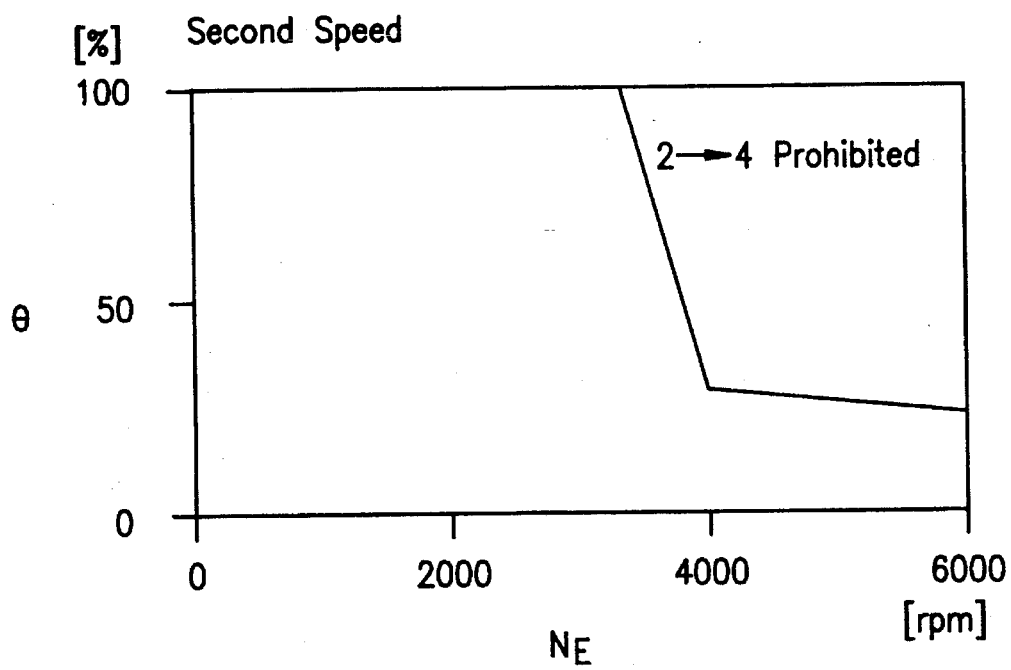
FIG. 11 is a graph showing a second embodiment of a limitation map according to the present invention.

Step S2-5: Read a limitation map such as one of those shown in FIGS. 10 and 11 for limiting a direct gear change to the targeted gear stage. A limitation map is provided for each gear stage and areas prohibiting various gear stage changes are set corresponding to the throttle opening $\theta$ and engine speed $N_E$. FIG. 10 shows a limitation map when the current gear stage is the first speed and FIG. 11 shows a limitation map for when the current gear stage is the second speed.

Step S2-6: Determine if the number (a) of the targeted gear stage is less than the number (b) of the current gear stage. If (a) is less than (b), advance to Step S2-7 and if (a) is more than (b), advance to Step S2-10.

Step S2-7: Determine if the number (a) of the targeted gear stage is equal to the number (b) of the current gear stage. If they are not equal, advance to Step S2-8 and if they are equal, advance to Step S2-9.

Step S2-8: Issue a down-shift gear change command.

Step S2-9: No gear change command is issued.

Step S2-10: Determine if a value obtained by subtracting the number (b) of the current gear stage from the number (a) of the targeted gear stage is 1. If the value is 1, advance to Step S2-11 and if it is not 1, advance to Step S2-13.

Step S2-11: Determine if the gear change to the targeted gear stage is prohibited by the limitation map read in Step S2-5. If it is prohibited, advance to Step S2-12 and it is not prohibited, advance to Step S2-9.

Step S2-12: Issue an up-shift gear change command.

Step S2-13: Determine if a gear change jump to the targeted gear stage is limited or not by the limitation map. If it is not limited, advance to Step S2-12 and if it is limited, advance to Step S2-14.

Step S2-14: Set a value obtained by subtracting 1 from the stage number (a) of the targeted gear stage as a new stage number (a) for the targeted gear stage.

Step S2-15: Determine whether or not the new stage number (a) of the targeted gear stage is equal to the stage number (b) of the current gear stage. If they are equal, advance to Step S2-9 and if they are not equal, advance to Step S2-16.

Step S2-16: Determine whether or not the new targeted gear stage is limited by the limitation map. If it is not limited, advance to Step S2-17 and if it is limited, return to Step S2-14.

Step S2-17: Set the new stage number (a) of the targeted gear stage as a stage number (c) of the intermediate gear stage.

Step S2-18: Issue a gear change command for a shift to the intermediate gear stage.

Next, a subroutine for determining a targeted gear stage number (a) (Step S2-1 in FIG. 8) will be explained with reference to FIGS. 12–15.

Figure 12:
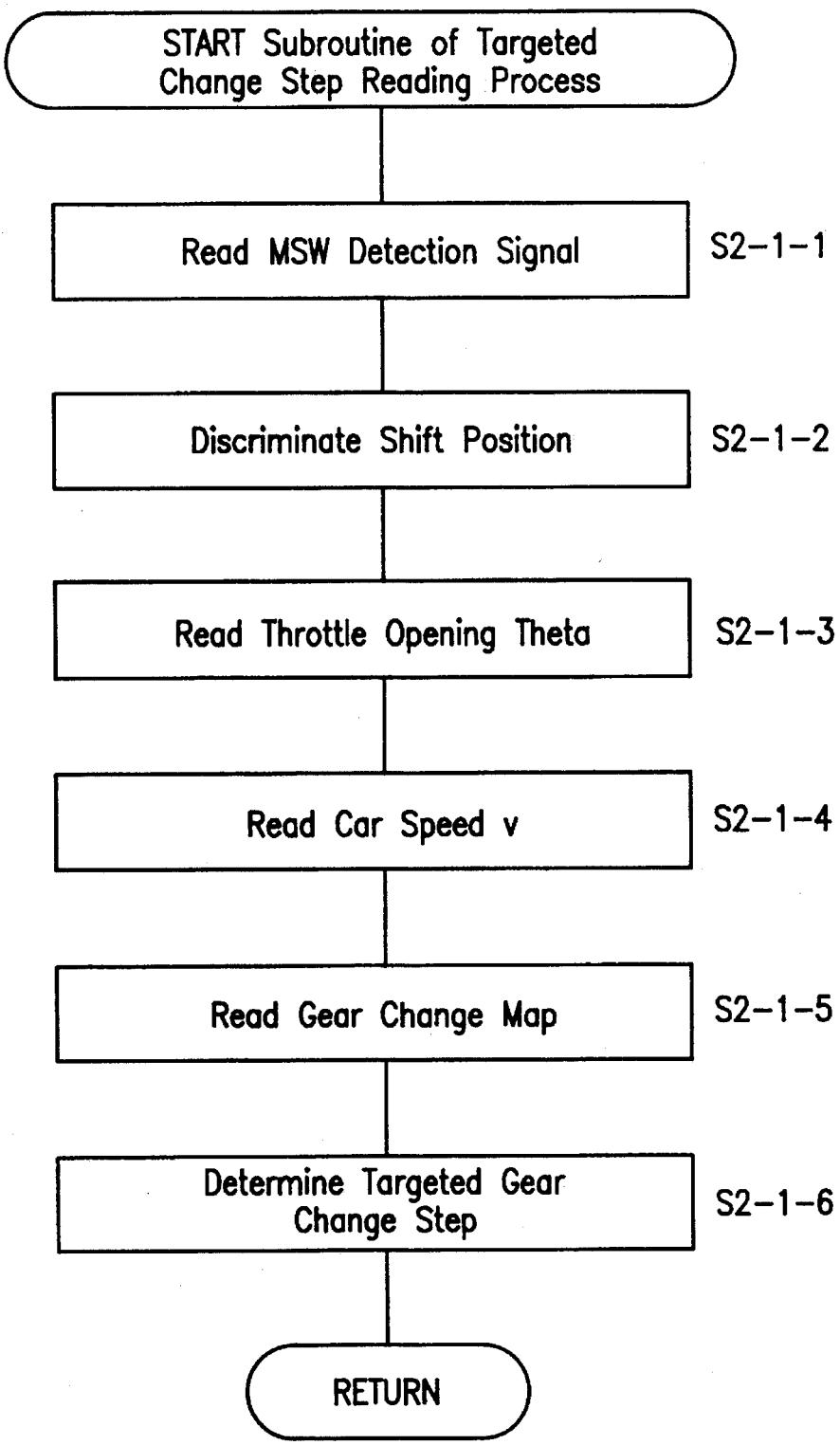
FIG. 12 is a flowchart of a subroutine for a targeted gear stage reading process in the present invention.

In FIG. 12:

Step S2-1—1: Read detection signals from the manual switches MSW1 through MSW4. As shown in FIG. 13, the manual switch MSW1 is turned on when a shift lever (not shown) is moved rearward (lower side in the figure), the manual switch MSW2 is turned on when the shift lever is moved forward (upper side in the figure), the manual switch MSW3 is turned on when the shift lever is moved to the right (right side in the figure) and the manual switch MSW4 is turned on when the shift lever is moved to the left (left side in the figure). Push button switches may be used instead of the shift lever.

Step S2-1-2: Determine shift position by applying the detection signals of the manual switches MSW 1 through MSW 4 to the table in FIG. 14.

In FIG. 14, D1 through D4 indicate respective shift positions, the mark (O) indicates that the respective manual switch (MSW 1 through MSW 4) is ON and mark (X) indicates that the respective manual switch is OFF.

Step S2-1-3: Read the throttle opening $\theta$.

Step S2-1-4: Read the car speed v.

Step S2-1-5: Read the gear change map for the determined shift position. FIG. 15 shows, by way of example, a gear change map for the shift position D3.

Step S2-1-6: Determine a targeted gear stage in accordance with the detected values for car speed v and throttle opening $\theta$ by reference to the gear change map.

A subroutine for the pattern discriminating process (Step S4 in FIG. 6) will be explained with reference to FIG. 16.

Figure 16:
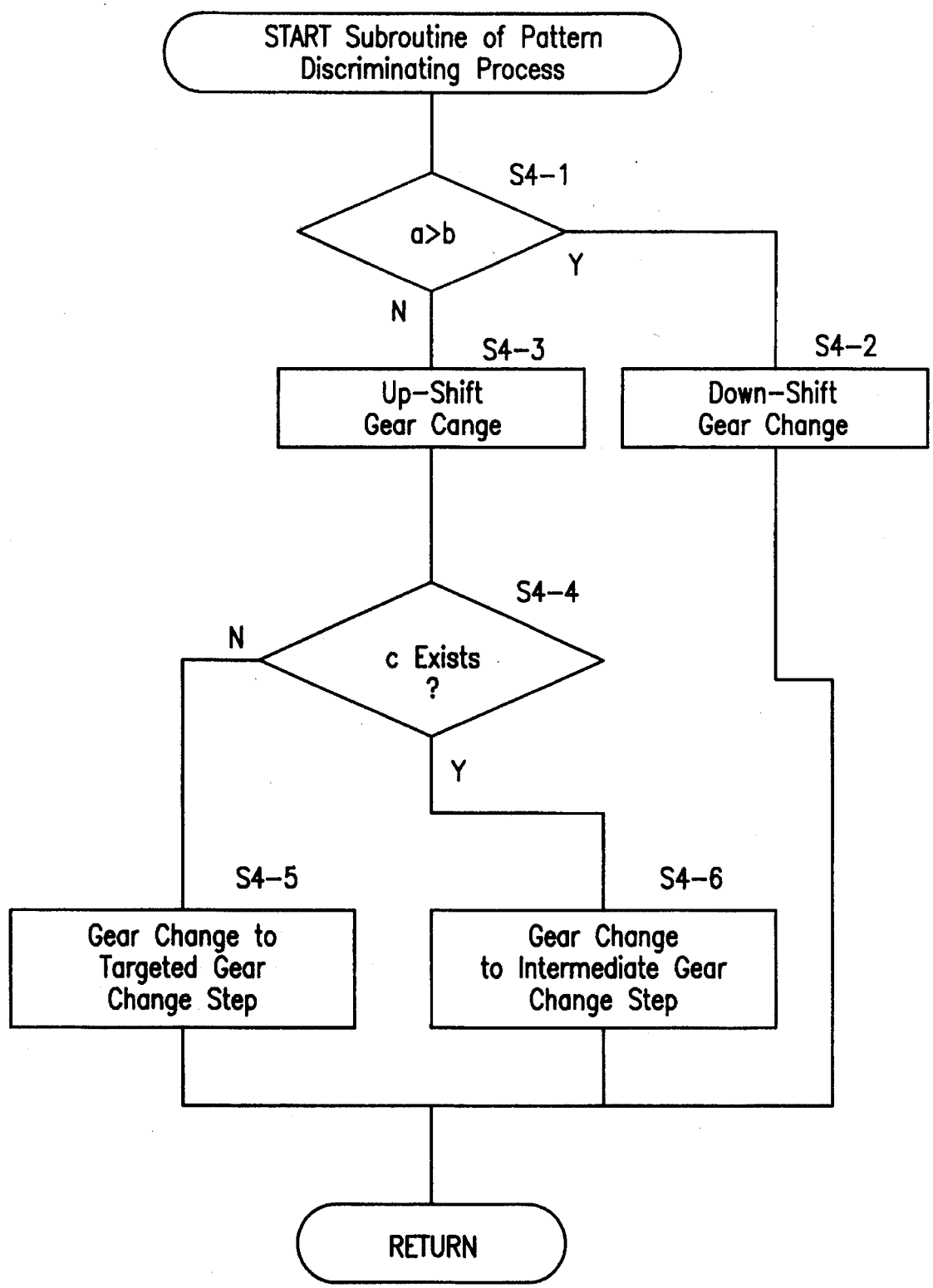
FIG. 16 is a flowchart of a subroutine for a pattern discriminating process in the present invention.

In FIG. 16:

Step S4-1: Determine whether or not the stage number (a) of the targeted gear stage is greater than the stage number (b) of the current gear stage. If (a) is greater, advance to Step S4-2 and if (a) is less, advance to Step S4-3.

Step S4-2: Determine that the gear change pattern of the vehicle is a down-shift gear change.

Step S4-3: Determine that the gear change pattern of the vehicle is an up-shift gear change.

Step S4-4: Determine if there exists a stage number (c) of an intermediate gear stage. If there exists no stage number (c), advance to Step S4-5 and if there does exist a stage number (c), advance to Step S4-6.

Step S4-5: Determine that gear change pattern of the vehicle is the targeted gear stage.

Step S4-6: Determine that the gear change pattern of the vehicle is to the intermediate gear stage.

Thus, a determination is made as to whether or not the gear change pattern of the vehicle is a down-shift gear change or an upshift gear change and, when it is an up-shift gear change, whether the gear change is directly to the targeted gear stage or through an intermediate gear stage.

Because the frictional engagement elements for establishing the intermediate gear stage and for establishing the targeted gear stage are conventionally engaged in succession by supplying oil to their hydraulic servos, such a two stage shift not only prolongs the gear change time, but also conveys an undesirable sensation to the driver due to the time required to raise the operating pressure. However, in the present invention the operating pressure to the hydraulic servos for the first brake B1 (FIG. 2), second brake B2, third brake B3, fourth brake B0 and second clutch C2 is quickly raised so that the wear of the frictional engagement elements may be minimized, the gear change time may be shortened, even when a gear change jump is made, and no undesirable sensation is conveyed to the driver.

FIG. 1 is a diagram illustrating a hydraulic circuit for the control system of the present invention.

In FIG. 1, $P_L$ denotes a line pressure, $P_D$ a D-range pressure, 51 a 1–2 shift valve for making a 1–2 gear change, 52 a 2–3 shift valve for making a 2–3 gear change, 53 a 3–4 shift valve for making a 3–4 gear change, 55 a pressure control valve, 57 an engine brake control valve and 59 a B-1 timing valve.

Further, B-1 denotes a hydraulic servo for the first brake B1 (FIG. 2), B-2 a hydraulic servo for the second brake B2, B-3 a hydraulic servo for the third brake B3, B-0 a hydraulic servo for the fourth brake B0, C-2 a hydraulic servo for the second clutch C2 and C-0 a hydraulic servo for the third clutch C0.

The hydraulic servo B-2 is supplied with oil via an orifice valve 61 which operates as an oil flow limiting means and operating pressure of the hydraulic servo B-2 is governed by an accumulator 62 connected via an orifice valve 63. The hydraulic servo B-0 is supplied with oil via an orifice valve 65 serving as oil flow limiting means, and operating pressure of the hydraulic servo B-0 is governed by an accumulator 67 connected via an orifice valve 66. The hydraulic servo C-2 is supplied with oil via an orifice valve 70 serving as oil flow limiting means, and operating pressure of the hydraulic servo C-2 is governed by an accumulator 72 connected via an orifice valve 71.

By the way, an orifice valve 73 is connected to the hydraulic servo C-0, a check valve 75 is connected to the hydraulic servo B-3 and a check valve 76 is connected to the orifice valve 70.

A solenoid valve S1 switches the 2–3 shift valve 52, a solenoid valve S2 switches the 1–2 shift valve 51 and 3–4 shift valve 53 a solenoid valve S3 switches the B-1 timing valve 59, a solenoid valve S4 switches the engine brake control valve 57 and the linear solenoid valve SLN governs the pressure of the pressure control valve 55.

In the hydraulic circuit constructed as described above, each solenoid of the solenoid valves S1 through S4 becomes ON when the 1–2 gear change is made. At this time, the 1–2 shift valve 51, 2–3 shift valve 52, 3–4 shift valve 53 and engine brake control valve 57 each come to the left half position shown in the drawing (hereinafter referred to as "the left half position") and the B-1 timing valve 59 comes to the right half position shown in the drawing (hereinafter referred to as the "right half position").

As a result, oil at the D-range pressure $P_D$ is supplied to the orifice valve 61 via the 1–2 shift valve 51 and its pressure is governed by the orifice valve 61 and then supplied to the hydraulic servo B-2. At this time, the operating pressure of the hydraulic servo B-2 is governed by the accumulator 62 to which oil is supplied via the orifice valve 63. By the way, the hydraulic servo C-0 has been engaged by supply of oil from the time of the first speed.

Thus the hydraulic servo B-2 can be supplied with oil by the limited oil supply circuit created via the orifice valve 61 and an oil path L-1.

When the 1–2 gear change is made quickly, each solenoid of the solenoid valves S1 and S2 turns on and each solenoid of the solenoid valves S3 and S4 turns off. At this time, the 1–2 shift valve 51, 2–3 shift valve 52, 3–4 shift valve 53 and B-1 timing valve 59 come to the left half position and the engine brake control valve 57 comes to the right half position. Further, the line pressure $P_L$ can be governed by the pressure control valve 55 by operation of the linear solenoid valve SLN. Accordingly, oil at the "controlled pressure" is supplied to the hydraulic servo B-2 via the engine brake control valve 57, 1–2 shift valve 51, 2–3 shift valve 52 and B-1 timing valve 59.

Next, when the 2–3 gear change is made, the solenoid of the solenoid valve S1 turns off and each solenoid of the solenoid valves S2 through S4 turns on. At this time, the 1–2 shift valve 51, 3–4 shift valve 53 and engine brake control valve 57 come to the left half position and the 2–3 shift valve 52 and B-1 timing valve 59 come to the 2–3 right half position.

As a result, oil at the D-range pressure $P_D$ is supplied to the orifice valve 70 via the 1–2 shift valve 51, 2–3 shift valve 52 and check valve 76 and, after its pressure is governed by the orifice valve 70, is supplied to the hydraulic servo C-2. At this time, the operating pressure of the hydraulic servo C-2 is controlled by the accumulator 72 to which oil is supplied via the orifice valve 71. The hydraulic servo C-0 and hydraulic servo B-2 have been engaged by oil pressure from the time of the second speed. Thus the hydraulic servo C-2 can be supplied with oil by the limited supply oil circuit created via the orifice valve 70.

When the 2–3 gear change is to be made quickly, each solenoid of the solenoid valves S1 and S4 is turned off and each solenoid of the solenoid valves S2 and S3 is turned on. At this time, the 1–2 shift valve 51 and 3–4 shift valve 53 come to the left half position and the 2–3 shift valve 52, engine brake control valve 57 and B-1 timing valve 59 come to the right half position. Further, the line pressure $P_L$ can be governed by the pressure control valve 55 by operation of the linear solenoid valve SLN.

Accordingly, oil at the controlled pressure is supplied to the hydraulic servo C-2 via the engine brake control valve 57, 1–2 shift valve 51, 2–3 shift valve 52 and 3–4 shift valve 53.

Next, when the 3–4 gear change is to be made, each solenoid of the solenoid valves S1 and S2 is turned off and each solenoid of the solenoid valves S3 and S4 is turned on. At this time, the 1–2 shift valve 51 and engine brake control valve 57 come to their respective left half positions and the 2–3 shift valve 52, 3–4 shift valve 53 and B-1 timing valve 59 come to their respective right half positions. As a result, oil at the D range pressure $P_D$ is supplied via the 3–4 shift valve 53 to the orifice valve 65, by which its pressure is governed, and then to the hydraulic servo B-0. At this time, the operating pressure of the hydraulic servo B-0 is controlled by the accumulator 67 to which oil is supplied via the orifice valve 66. Incidentally, the hydraulic servo C-2 and hydraulic servo B-2 have been supplied with oil from the time of the third speed. Thus the hydraulic servo B-2 can be supplied with oil by the limited supply oil circuit created via the orifice valve 65 and an oil path L-3.

When the 3–4 gear change is made quickly, each solenoid of the solenoid valves S1, S2 and S4 turns off and the solenoid of the solenoid valve S3 turns on. At this time, the 1–2 shift valve 51 comes to its left half position and the 2–3 shift valve 52, 3–4 shift valve 53, engine brake control valve 57 and B-1 timing valve 59 come to their respective right half positions. Further, the line pressure $P_L$ can be governed by the pressure control valve 55 by operation the linear solenoid valve SLN. Accordingly, oil at the controlled pressure is supplied to the hydraulic servo B-0 via the engine brake control valve 57 and 3–4 shift valve 53.

As described above, oil can be supplied to each of the hydraulic servos B-2, B-0 and C-2, not only by the limited supply oil circuit created going through the orifice valves 61, 65 and 70, but also by the quick supply oil circuit created bypassing the orifice valves 61, 65 and 70, when the 1–2, 2–3 and 3–4 gear changes are made. Accordingly, the present invention provides for speedy increase of the operating pressure of each of the hydraulic servos B-2, B-0 and C-2, to quickly engage the second brake B2, fourth brake B0 and second clutch C2 and to thereby shorten the gear change time. Further, because the operating pressure can be generated directly by the linear solenoid valve SLN, the operating pressure in the transient state may be accurately controlled.

On the other hand, the limited supply oil circuit supplies oil at the line pressure $P_L$ to a predetermined hydraulic servo even in the case of a failure, thereby allowing control of the gear change to be maintained.

When a gear change jump is to be made in the present invention, oil is supplied to one of the hydraulic servos B-2, B-0 and C-2 which serves as the first hydraulic servo, via the quick supply oil circuit to make a gear change to a targeted gear stage and oil is supplied to one of the hydraulic servos B-2, B-0 and C-2 which serves as the second hydraulic servo, via the limited supply oil circuit to make a gear change to an intermediate gear stage. At this time, although the quick supply oil circuit and limited supply oil circuit for making the gear change to the targeted gear change step are in communication, oil of the limited supply oil circuit will not enter the quick supply oil circuit because hydraulic pressure within the quick supply oil circuit is generally higher than that within the limited supply oil circuit.

Because the gear change to the targeted gear stage step may thus be made independently from the gear change to the intermediate gear stage, the gear change time to the targeted gear stage may be shortened and the operating pressure in the transient state may be accurately controlled.

By the way, when the direct gear change to the targeted gear stage is prohibited, oil is supplied to each of the hydraulic servos B-2, B-0 and C-2 via the quick supply oil circuit to make the gear change to the intermediate gear stage and the further gear change to the targeted gear stage is initiated immediately before the gear stage change to the intermediate gear stage ends. Then oil is supplied via the limited supply oil circuit to each of the hydraulic servos B-2, B-0 and C-2, to which oil had been supplied until immediately before the gear change to the intermediate gear stage ended, and oil is supplied via the quick oil supply circuit to each of the hydraulic servos B-2, B-0 and C-2 for making the gear change to the targeted gear stage.

Thus, even when a gear change going through the intermediate gear stage is made, a continuity is maintained between the gear change to the intermediate gear stage and the gear change to the targeted gear stage, so that shift shock can be suppressed and the gear change time can be shortened.

The determination that the gear change to the intermediate gear change step is about to be completed is made by first determining the difference between rotary speeds, $$\Delta N = N_T - N_O * I_C$$

wherein:

$N_T$ is the input rotary speed, $N_O$ is the output rotary speed, and $I_C$ is the gear ratio of the intermediate gear.

It is then determined whether or not the difference $\Delta N$ has become greater than a discrimination rotary speed $N_{NEXT}$. The discrimination rotary speed $N_{NEXT}$ is individually set for each intermediate gear stage with the throttle opening theta as a parameter.

Next, a subroutine for the valve switching process, operating pressure controlling process and gear change state discriminating process (Step S5 in FIG. 6) will be explained with reference to FIGS. 17–19, using the 1→3 gear change as an example of a gear change jump.

Figure 18:
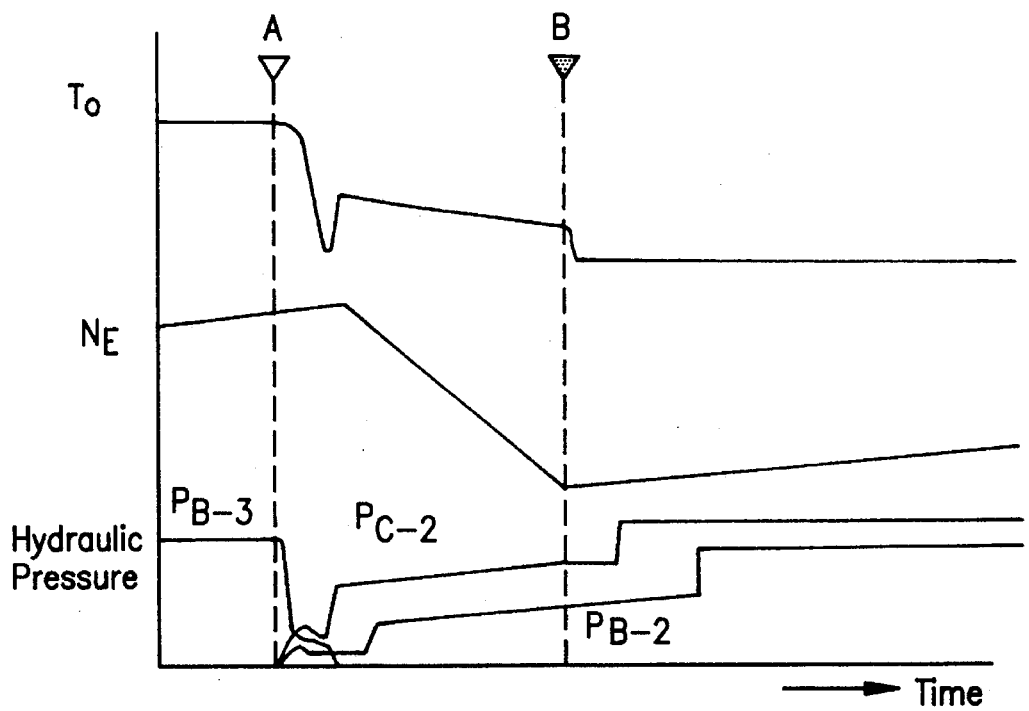
FIG. 18 is a time chart showing a gear change jump in the present invention.
Figure 19:
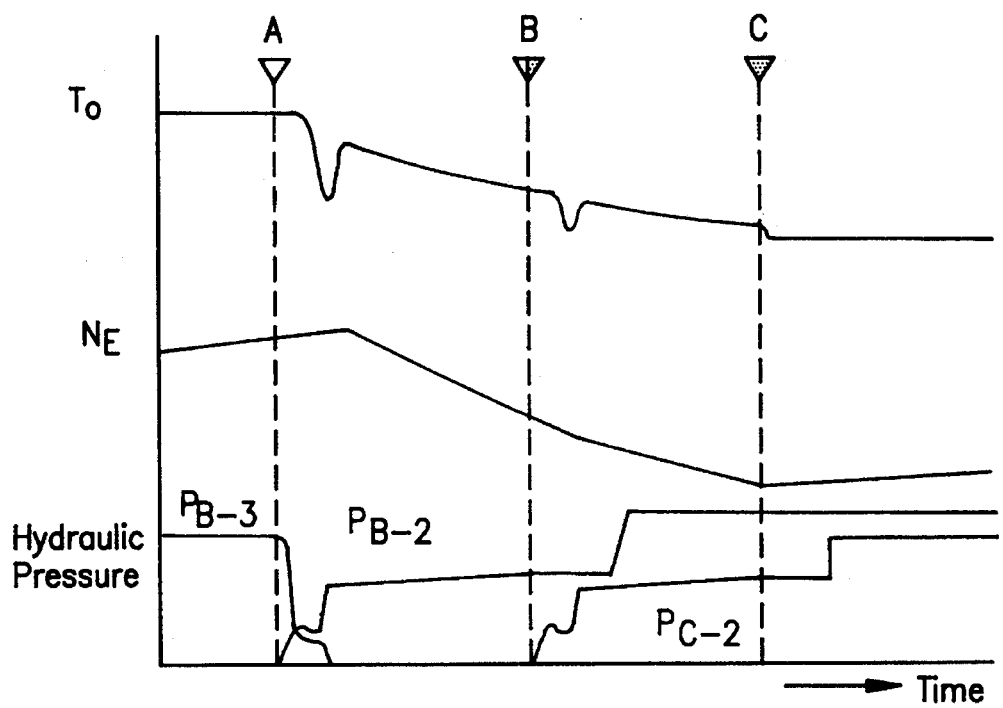
FIG. 19 is a time chart showing a gear change jump made via an intermediate gear stage in the present invention.

In FIGS. 18 and 19, $T_O$ denotes an output shaft torque, $N_E$ an engine speed, $P_{B-3}$ operating pressure of the hydraulic servo B-3 (FIG. 1), $P_{C-2}$ operating pressure of the hydraulic servo C-2 and $P_{B-2}$ operating pressure of the hydraulic servo B-2.

Figure 17:
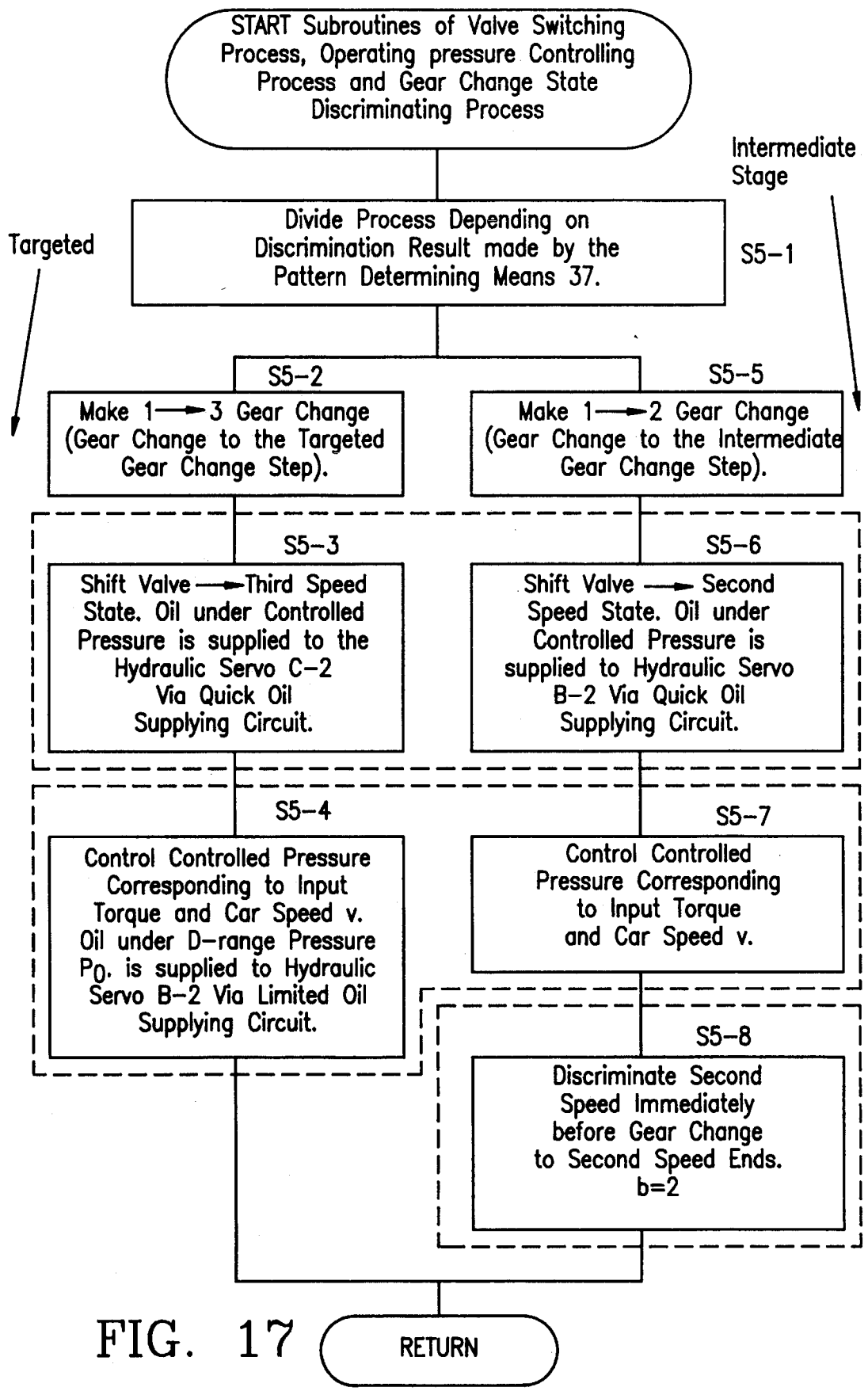
FIG. 17 is a flowchart of a subroutine for a valve switching process, operating pressure controlling process and gear change state discriminating process in the present invention.

In FIG. 17:

Step S5-1: Choose one of two process paths, with the choice between the two paths depending on the determination made by the pattern determining means 37. If the gear change pattern of the vehicle is determined to be the gear change to the targeted gear stage in Step S4-5 of FIG. 16, advance to Step S5-2 and if the gear change pattern of the vehicle is determined to be the gear change to the intermediate gear stage, advance to Step S5-5.

Step S5-2: Perform the 1→3 gear change (gear change to the targeted gear stage).

Step S5-3: The valve switching means 38 (FIG. 5) puts the 1–2 shift valve 51, 2–3 shift valve 52 and 3–4 shift valve 53 into the third speed state at a point in time A in FIG. 18. Then oil at the controlled pressure, i.e. as regulated by the pressure control valve 55, is supplied to the hydraulic servo C-2 via the quick supply oil circuit by the engine brake control valve 57.

Step S5-4: The operating pressure control means 42 governs the controlled pressure responsive to the input torque and car speed v. During this time, oil at the D-range pressure $P_D$ is supplied to the hydraulic servo B-2 via the limited supply oil circuit as shown in FIG. 18 and oil in the hydraulic servo B-3 is rapidly drained. At point B in FIG. 18, a determination is made that a change of rotary speed has been completed and, after that, oil is supplied to the hydraulic servo C-2 and hydraulic servo B-2 via the limited supply oil circuit.

Step S5-5: Perform the 1→2 gear change (gear change to the intermediate gear stage).

Step S5-6: The valve switching means 38 puts the 1–2 shift valve 51, 2–3 shift valve 52 and 3–4 shift valve 53 into the second speed state at point A in FIG. 19. Oil at the controlled pressure governed by the pressure control valve 55 is supplied to the hydraulic servo B-2 via the quick supply oil circuit by the B-1 timing valve 59.

Step S5-7: The operating pressure control means 42 governs the controlled pressure responsive to the input torque and car speed v.

Step S5-8: The gear change state discriminating means 36 makes a determination of the second speed at point B immediately before the end of the gear change to the second speed. The stage number (b) of the current gear stage is set as 2. Then the processes in Step S5-1 through S5-4 are performed and a determination is made as to whether or not the change in rotary speed has finished at point C in FIG. 19. After that, oil is supplied to the hydraulic servo C-2 and hydraulic servo B-2 via the limited oil supply circuit.

Figure 21:
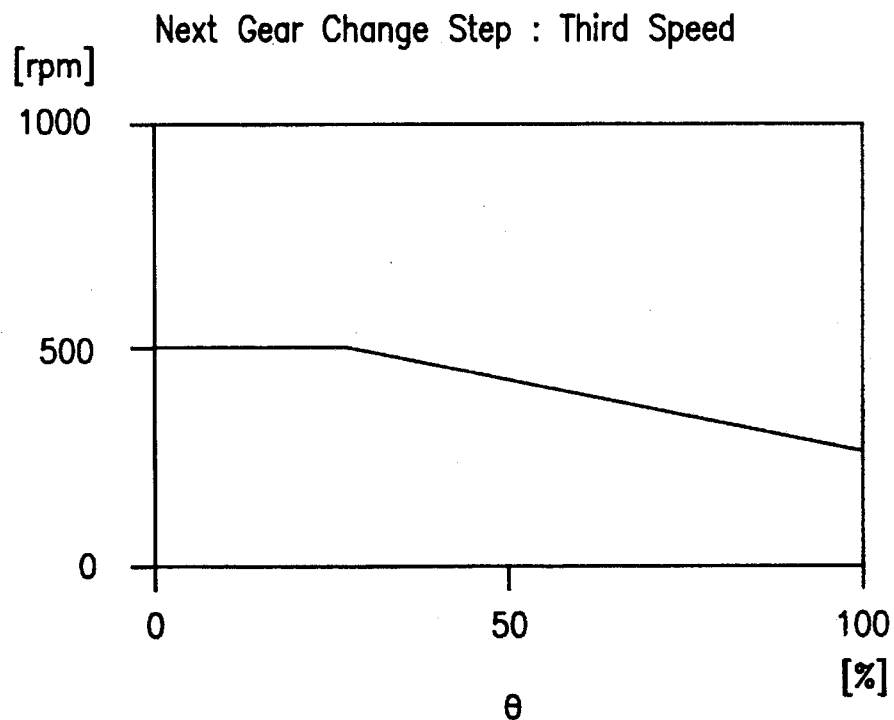
FIG. 21 is a graph showing a first embodiment of a determination of rotary speed map according to the present invention.
Figure 22:
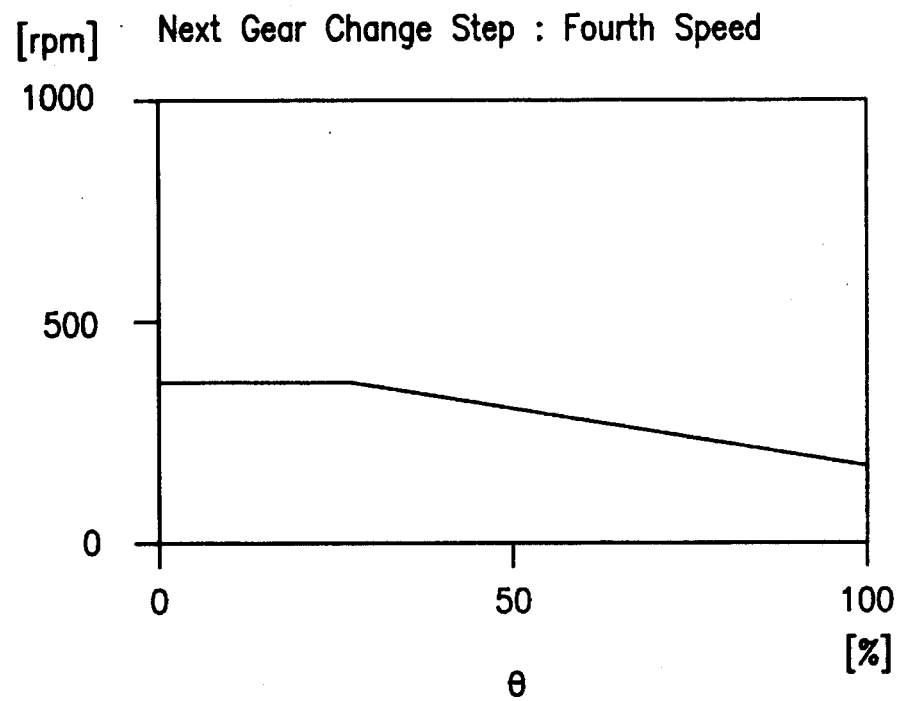
FIG. 22 is a graph showing a second embodiment of the determination of rotary speed map according to the present invention.

Next, a subroutine for the gear change state discriminating process (Step S5 in FIG. 6) will be explained with reference to FIGS. 20–22.

Figure 20:
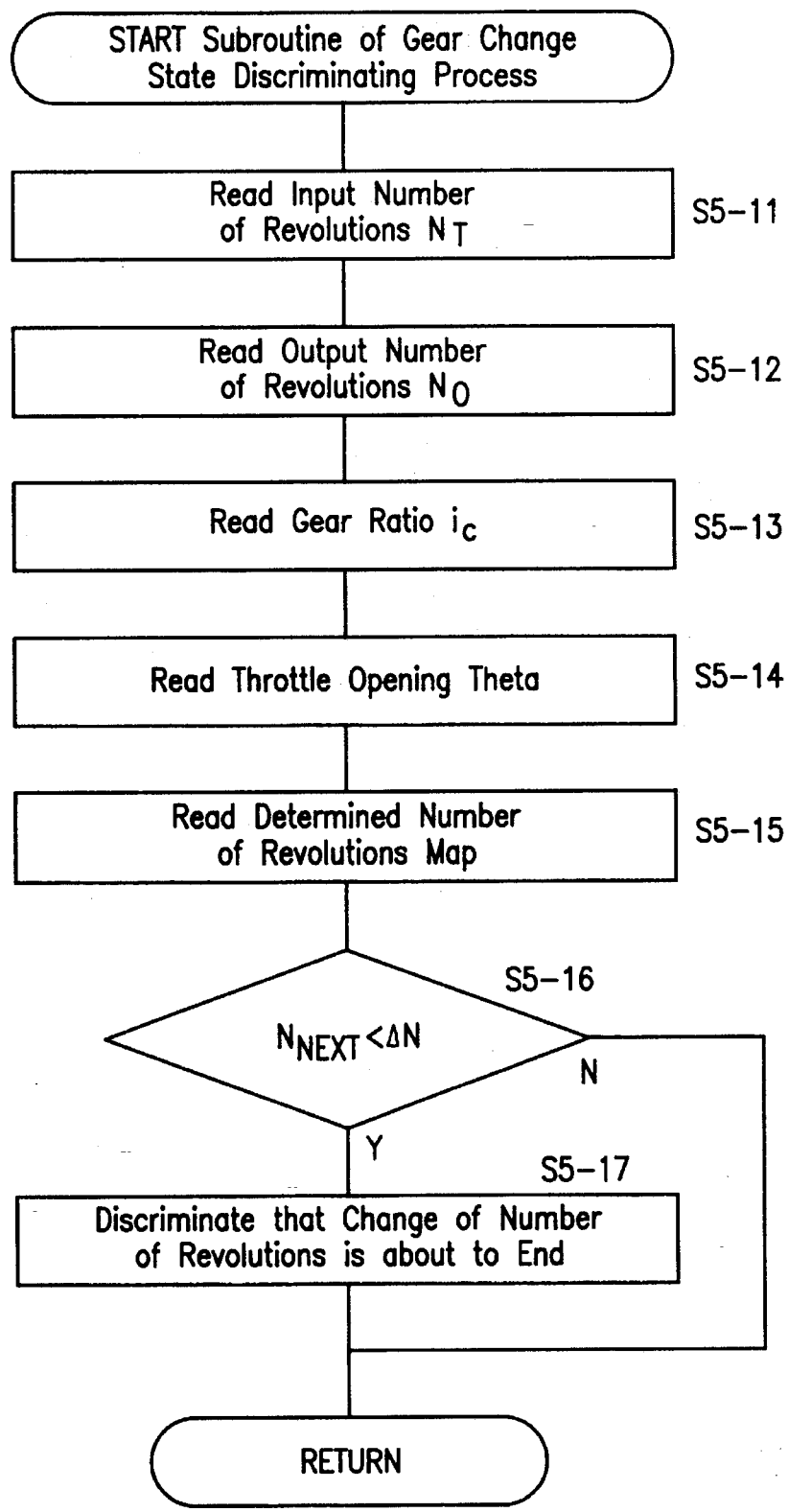
FIG. 20 is a flowchart of a subroutine for the gear change state discriminating process in the present invention.

In FIG. 20:

Step S5-11: Read the input rotary speed $N_T$.

Step S5-12: Read the output rotary speed $N_O$.

Step S5-13: Read the gear ratio $i_C$ of the intermediate gear stage.

Step S5-14: Read the throttle opening θ.

Step S5-15: Read the determination of rotary speed map created for the intermediate gear stage using the throttle opening θ as a parameter. FIG. 21 shows a determination of rotary speed map for the third speed and FIG. 22 shows a determination of rotary speed map for the fourth speed.

Step S5-16: Determine whether or not the discrimination value for rotary speed $N_{NEXT}$ is smaller than $\Delta N$. If $N_{NEXT}$ is smaller than $\Delta N$, advance to Step S5-17 and when $N_{NEXT}$ is greater than $\Delta N$, the process is returned.

Step S5-17: A determination is made whether or not the change in rotary speed has been completed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A controller for an automatic transmission mounted in a vehicle, comprising:

a first hydraulic servo to which oil is supplied to make a gear change jump from a current gear stage directly to a targeted gear stage which is at least two gear stages different from said current gear stage;

a second hydraulic servo to which oil is supplied to make a gear change from the current gear stage to an intermediate gear stage which is only one gear stage different from said current gear stage;

a source of line pressure;

pressure governing means for changing the line pressure into a controlled pressure and for governing said controlled pressure;

a limited supply oil circuit, including oil flow limiting means for limiting oil flow supplied therethrough, for supplying the line pressure to one of said first hydraulic servo and second hydraulic servo;

a quick supply oil circuit, bypassing said oil flow limiting means, for supplying said controlled pressure to one of said first hydraulic servo and said second hydraulic servo; and oil path switching means for switching between said limited supply oil circuit and said quick supply oil circuit to supply oil either to said first hydraulic servo to make said gear change jump to said targeted gear stage or to second hydraulic servo to make said gear change to said intermediate gear stage.

2. The controller of claim 1 further comprising:

pattern determination means for determining a gear change pattern in accordance with a traveling condition of the vehicle, said oil path switching means switching between said limited supply oil circuit and said quick supply oil circuit in accordance with the gear change pattern determined by said pattern determination means.

3. The controller according to claim 2, wherein said pattern determination means determines whether either to make said gear change jump to said targeted gear stage or to make said gear change to said intermediate gear stage.

4. The controller according to claim 3, wherein said oil path switching means supplies said controlled pressure through said quick supply oil circuit to said first hydraulic servo responsive to a determination by said pattern determination means to make said gear change jump to said targeted gear stage.

5. The controller according to claim 3, wherein said oil path switching means supplies said controlled pressure through said quick supply oil circuit to said second hydraulic servo responsive to a determination by said pattern determination means to make said gear change to said intermediate gear stage.

6. The controller according to claim 5 further comprising:

a gear change state determination means for determining whether or not said gear change to said intermediate gear stage is about to be completed, wherein, responsive to a determination by said gear change state determination means that said gear change to said intermediate gear stage is about to be completed, said oil path switching means supplies said controlled pressure through said quick oil circuit to said first hydraulic servo.

7. The controller according to claim 6, wherein said gear change state determination means determines that said gear change to said intermediate gear stage is about to be completed when the difference $\Delta N$ between an input rotary speed $N_T$ and a rotary speed $N_O*I_C$, said rotary speed $N_O*I_C$ being the product of multiplication of an output rotary speed ($N_O$) by gear ratio ($I_C$) of said intermediate gear stage, becomes greater than a predetermined rotary speed $N_{NEXT}$.

8. The controller according to claim 1, wherein said pressure governing means comprises a pressure control valve for controlling said controlled pressure, and a linear solenoid valve for controlling said pressure control valve.

9. The controller according to claim 1, wherein said oil path switching means comprises shift valves which are switched to either make said gear change jump to said targeted gear stage or to make said gear change to said intermediate gear stage, and solenoid valves for switching said shift valves.

10. The controller according to claim 1, wherein said oil path switching means comprises a switching valve for either one of supplying or cutting said controlled pressure to said quick supply oil circuit, and a solenoid valve for controlling said switching valve.

* * * * *

UNITED STATES PATENT AND TRADEMARK OFFICE
CERTIFICATE OF CORRECTION

PATENT NO. : 5,573,478
DATED : November 12, 1996
INVENTOR(S) : TSUKAMOTO et al

It is certified that error appears in the above-indentified patent and that said Letters Patent is hereby corrected as shown below:

Col. 6, line 46, "8" should read --$\theta$--.
Col. 14, line 33, "AN" should read --$\Delta N$--.

Signed and Sealed this

Twenty-third Day of September, 1997

Attest:

BRUCE LEHMAN

Attesting Officer

Commissioner of Patents and Trademarks